United States Patent [19]

Yonezawa et al.

[11] 4,079,367
[45] Mar. 14, 1978

[54] APPARATUS FOR FORMING A CHARACTER OUT OF A PATTERN OF SEPARATE DISPLAY PICTURE ELEMENTS

[75] Inventors: Setsuo Yonezawa, Kawasaki; Tsuneta Kawakami; Tatsuo Shimada, both of Tokyo; Yoshinori Chida, Matsudo, all of Japan

[73] Assignee: Kabushiki Kaisha Seikosha, Japan

[21] Appl. No.: 643,143

[22] Filed: Dec. 22, 1975

[30] Foreign Application Priority Data

Dec. 28, 1974 Japan .................................... 50-1883

[51] Int. Cl.² ............................................... G06F 3/14
[52] U.S. Cl. ............................... 340/324 AD; 178/30; 358/133
[58] Field of Search ................... 340/324 M, 324 AD; 178/15, 30, DIG. 3; 358/133, 138

[56] References Cited

U.S. PATENT DOCUMENTS

| 3,573,789 | 4/1971 | Sharp et al. | 340/324 AD |
| 3,893,100 | 7/1975 | Stein | 340/336 |

*Primary Examiner*—Marshall M. Curtis
*Attorney, Agent, or Firm*—Robert E. Burns; Emmanuel J. Lobato; Bruce L. Adams

[57] ABSTRACT

Between picture elements of a character, such as letter, numeral and symbol, which is formed of a pattern of the separate display picture elements, a display picture element for interpolation is formed in conformity with predetermined rules, so that the shape of the character as intended to be displayed has its naturalness held and that the character can be formed in a proper size.

12 Claims, 21 Drawing Figures

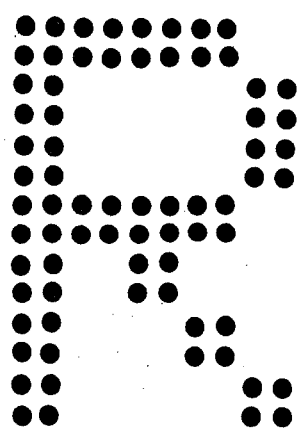

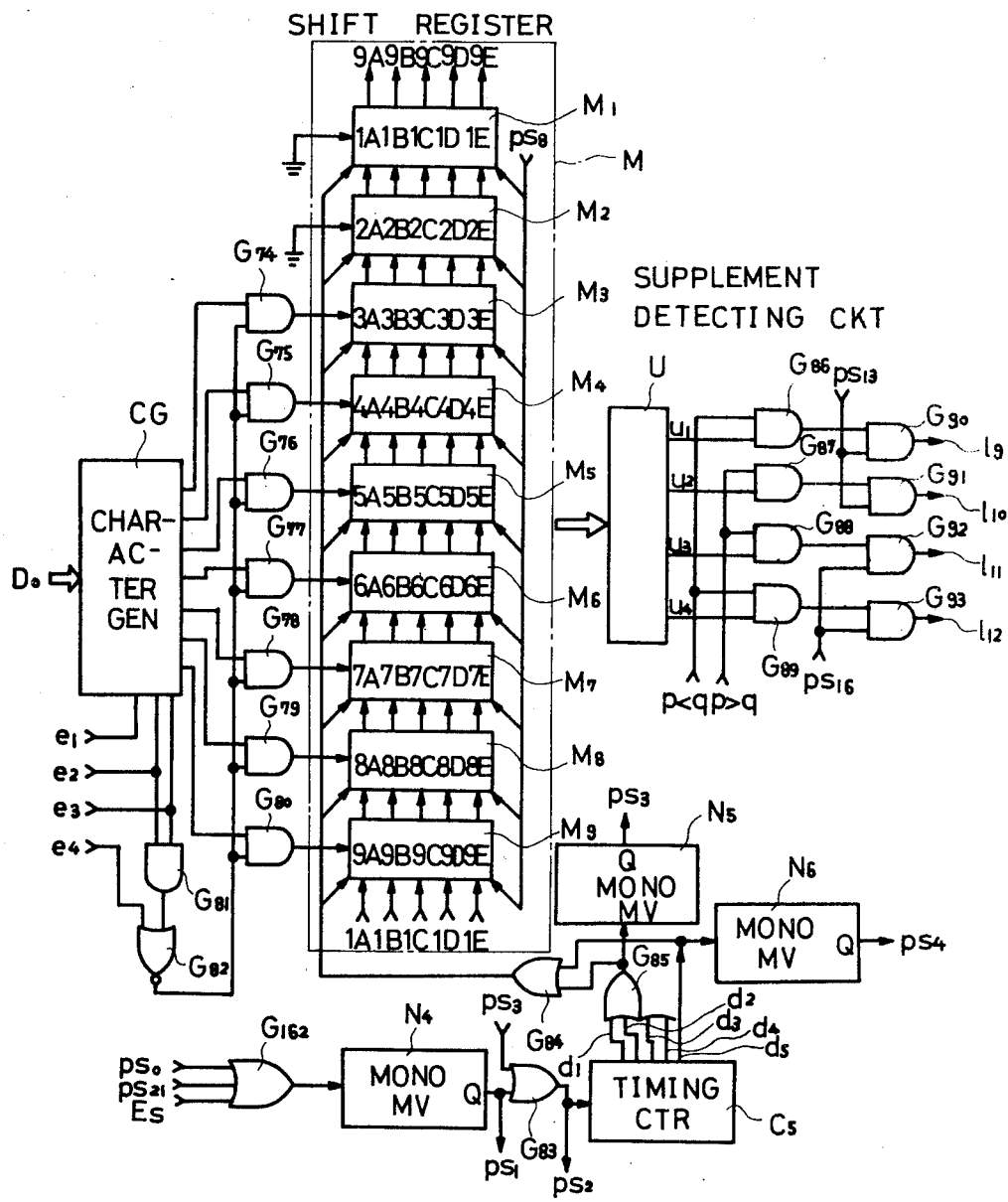

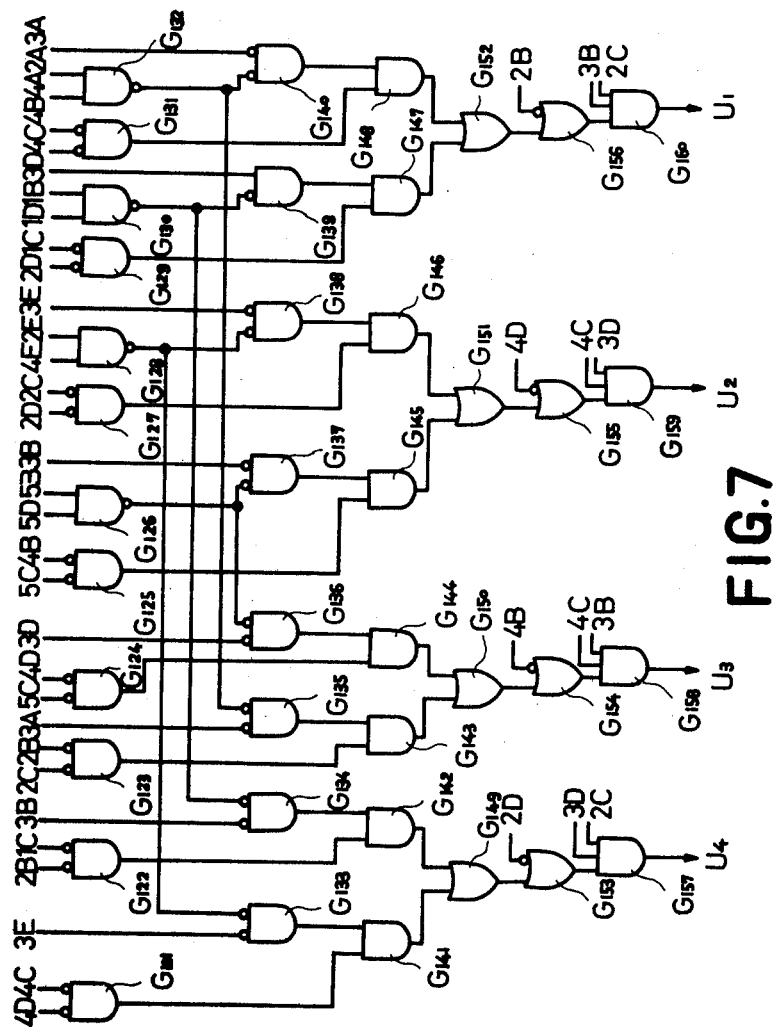

|    | A | B | C | D | E |
|----|---|---|---|---|---|
| M₁ | 0 | 0 | 0 | 0 | 0 |
| M₂ | 0 | 0 | 0 | 0 | 0 |
| M₃ | 0 | 0 | 1 | 1 | 1 |
| M₄ | 0 | 0 | 1 | 0 | 0 |
| M₅ | 0 | 0 | 1 | 0 | 0 |
| M₆ | 0 | 0 | 1 | 1 | 1 |
| M₇ | 0 | 0 | 1 | 0 | 1 |
| M₈ | 0 | 0 | 1 | 0 | 0 |
| M₉ | 0 | 0 | 1 | 0 | 0 |

FIG.11

|    | A | B | C | D | E |
|----|---|---|---|---|---|
| M₁ | 0 | 0 | 0 | 0 | 0 |
| M₂ | 0 | 0 | 1 | 1 | 1 |
| M₃ | 0 | 0 | 1 | 0 | 0 |
| M₄ | 0 | 0 | 1 | 0 | 0 |
| M₅ | 0 | 0 | 1 | 1 | 1 |
| M₆ | 0 | 0 | 1 | 0 | 1 |
| M₇ | 0 | 0 | 1 | 0 | 0 |
| M₈ | 0 | 0 | 1 | 0 | 0 |
| M₉ | 0 | 0 | 0 | 0 | 0 |

| C\F | 0 | 1 | 2 | 3 | -- | -- | m |
|---|---|---|---|---|---|---|---|
| 1 | 1 | 1 | 1 | 1 | 1 | 1 | |
| 2 | 1 | 1 | 1 | 1 | 1 | | 0 |
| 3 | 1 | 1 | 1 | 1 | | 0 | 0 |
| 4 | 1 | 1 | 1 | | 0 | 0 | 0 |
| ¦ | 1 | 1 | | 0 | 0 | 0 | 0 |
| ¦ | 1 | | 0 | 0 | 0 | 0 | 0 |
| m | | 0 | 0 | 0 | 0 | 0 | 0 |

B

| C\F | 0 | 1 | 2 | 3 | -- | -- | m |
|---|---|---|---|---|---|---|---|
| 1 | | 0 | 0 | 0 | 0 | 0 | 0 |
| 2 | 1 | | 0 | 0 | 0 | 0 | 0 |
| 3 | 1 | 1 | | 0 | 0 | 0 | 0 |
| 4 | 1 | 1 | 1 | | 0 | 0 | 0 |
| ¦ | 1 | 1 | 1 | 1 | | 0 | 0 |
| ¦ | 1 | 1 | 1 | 1 | 1 | | 0 |
| m | 1 | 1 | 1 | 1 | 1 | 1 | |

C

| C\F | 0 | 1 | 2 | 3 | -- | -- | m |
|---|---|---|---|---|---|---|---|
| 1 | | 1 | 1 | 1 | 1 | 1 | 1 |
| 2 | 0 | | 1 | 1 | 1 | 1 | 1 |
| 3 | 0 | 0 | | 1 | 1 | 1 | 1 |
| 4 | 0 | 0 | 0 | | 1 | 1 | 1 |
| ¦ | 0 | 0 | 0 | 0 | | 1 | 1 |
| ¦ | 0 | 0 | 0 | 0 | 0 | | 1 |
| m | 0 | 0 | 0 | 0 | 0 | 0 | |

D

| C\F | 0 | 1 | 2 | 3 | -- | -- | m |
|---|---|---|---|---|---|---|---|
| 1 | 0 | 0 | 0 | 0 | 0 | 0 | |
| 2 | 0 | 0 | 0 | 0 | 0 | | 1 |
| 3 | 0 | 0 | 0 | 0 | | 1 | 1 |
| 4 | 0 | 0 | 0 | | 1 | 1 | 1 |
| ¦ | 0 | 0 | | 1 | 1 | 1 | 1 |
| ¦ | 0 | | 1 | 1 | 1 | 1 | 1 |
| m | | 1 | 1 | 1 | 1 | 1 | 1 |

APPARATUS FOR FORMING A CHARACTER OUT OF A PATTERN OF SEPARATE DISPLAY PICTURE ELEMENTS

BACKGROUND OF THE INVENTION

This invention relates to an apparatus and method for forming a character, such as letter, numeral and symbol, out of separate display picture elements. More particularly, it relates to an apparatus and method for forming a character out of a pattern of separate display picture elements, the apparatus being adapted to hold the naturalness of the shape of the character and to form the character on an enlarged scale.

In general, in case of forming a letter, numeral, symbol or the like by the use of a dot matrix, the character formed is not very illegible within a certain range of sizes. At some extent of size, however, illegible characters appear. For example "E" and "F" which are letters constructed only of horizontal and vertical lines offer no serious problem even when simply enlarged. In contrast, letters including oblique lines, such as "R" and "X," become very difficult to read. FIG. 1 shows an example which is obtained by magnifying double the letter "R" formed of a dot matrix of 7 rows and 5 columns as illustrated in FIG. 2. As apparent from the drawing, the magnified letter is very illegible. Moreover, as the magnification becomes larger, the reading becomes difficult.

There has heretofore been a technique in which subsidary dots are printed between adjacent dots of a main dot matrix for the dot character as stated above, thus to enhance the clearness of oblique lines and the naturalness of the character. In the case of the prior-art technique, however, the sizes of the character are subject to a prescribed normalization, and upper and lower or right and left straight lines of the character are not adjusted at all.

As means for magnifying the character as described above, a complicated circuit system has been divised. This is undesirable.

SUMMARY OF THE INVENTION

The present invention overcomes the above-mentioned difficulties and provides a newly improved apparatus and method for forming a character out of a pattern of separate display picture elements.

A feature of this invention consists in that a matrix pattern in which a character formed of separate display components or display picture elements is divided into the form of matrices and separated into display components or display picture elements and non-display components or non-display picture elements is supposed, and that when the matrix of 2 rows and 2 columns or 3 rows and 3 columns in the matrix pattern as includes any one non-display picture element conforms with a rule set beforehand, a display picture element for interpolation is formed in the aforecited any one non-display picture element, whereby the shape which the character intends to display is rendered clearly recognizable. The character formed of the pattern of the display picture elements can be enlarged up to a proper magnification without employing a complicated system such as computer, so that the circuit mechanism is simplified and that the apparatus is small-sized. As the character formed of the pattern of the display picture elements is magnified more, the shape which the character intends to display is distorted more. At large magnifications, therefore, it is effectively contributive that the magnified character is formed with the interpolating display picture element.

The first object of this invention is that when a character formed of a picture element pattern assumes a specific condition, a picture element for interpolation is formed so as to clarify the shape which the character intends to display, and that the character of a proper size is formed by a simple construction without relying on a complicated system.

The second object of this invention is that when notice is taken of any matrix of 2 rows and 2 columns in a character formed of a picture element pattern and a pattern of picture elements of the matrix conforms with a specified rule, an interpolating picture element is formed in a non-picture element (null picture element) portion between the picture elements, whereby the character especially on an enlarged scale is more clearly indicated.

The third object of this invention is that when notice is taken of any matrix 3 rows and 3 columns in a character formed of a picture element pattern and a pattern of picture elements of the matrix conforms with a specified rule different from the above-mentioned one, an interpolating picture element is formed in a non-picture element (null picture element) portion between the picture elements, whereby the character especially on an enlarged scale has the naturalness of its shape held.

The fourth object of this invention is that a character is formed out of a picture element pattern at a proper magnification without relying on a complicated system.

The fifth object of this invention is that when notice is taken of any matrix of 2 rows and 2 columns and any matrix of 3 rows and 3 columns in patterns of picture elements of a character formed of a picture element pattern and they conform with specified rules, interpolating picture elements are formed in non-picture element portions (null picture element portions) between the picture elements, whereby the naturalness of the shape which the character displays is held when the character is magnified to a proper given size.

BRIEF DESCRIPTION OF THE DRAWING

The nature of the present invention as well as other objects and advantages thereof will become more apparent from consideration of the following detailed description and the accompanying drawing in which:

FIG. 1 shows an enlarged dot character in a prior art type system,

FIG. 2 shows the original dot character of FIG. 1,

FIG. 3 shows a doubly enlarged dot character of the letter "R" for explaining an embodiment of this invention, FIGS. 6A to 6H show logical circuits illustrative of an embodiment of this invention, FIG. 7 is a diagram in which the dot pattern of FIG. 2 is represented by a bit pattern, FIGS. 8 and 9 are diagrams showing the first and second interpolation rules by bit patterns, FIGS. 10 and 11 are bit contents diagrams each showing a memory state of a shift register M, FIG. 12 is a bit contents diagram for explaining logics of a supplement detecting circuit.

DESCRIPTION OF THE PREFERRED EMBODIMENTS

Figure 4:
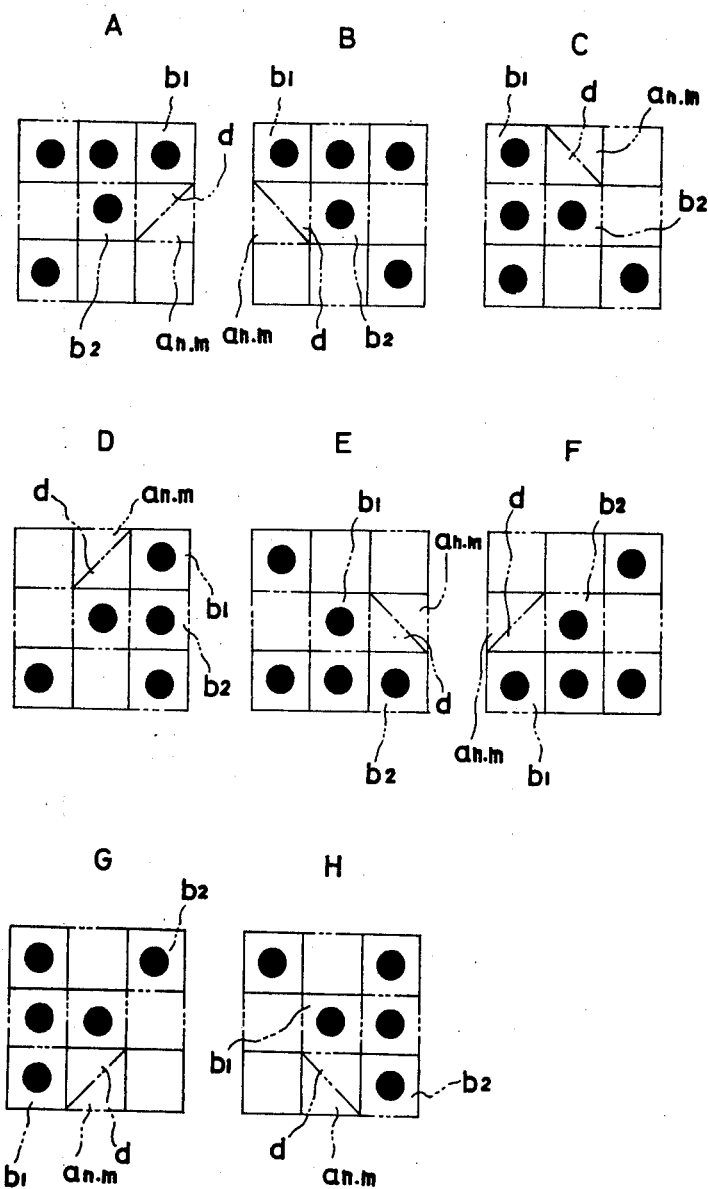
FIGS. 4 and 5 are dot arrangement diagrams illustrating interpolation rules of this invention.
Figure 5:
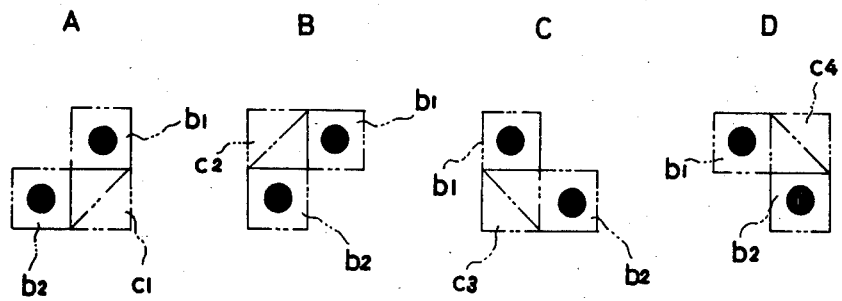

In the following embodiments, the interpolation rules of this invention will be first described in detail, and devices for performing the enlargement and interpolation of a character will be subsequently explained. The expression "supplementary space" used in this specification signifies that when a pattern formed of a plurality of dot matrices cannot clearly indicate an object originally intended to be displayed, a dot is formed between adjacent dots.

FIG. 2 shows an original character pattern "R" constructed of a dot matrix of 7 rows and 5 columns, and the character pattern is enlarged double and illustrated by black circular dots in FIG. 3. Description will be made of the first interpolation rule for a part of the character which becomes unclear due to the enlargement. Dot forming parts and non-dot forming parts (null dot forming parts) which constitute the original pattern "R" of FIG. 2 are divided into a domain pattern of 7 rows and 5 columns as in the figure. Notice is taken of any one domain $[n, m]$ ($n$ and $m$ denote Nos. of the row and column, respectively), and a minor matrix of 3 rows and 3 columns including the domain $[n, m]$ is constructed. The minor matrix is not arbitrary, but it is picked out from the domain of FIG. 1 so that, assuming the domain $[n, m]$ to be at a position $[p, q]$ in the Nos. of the row and the column set in the minor matrix, the sum $(p + q)$ of the Nos. of the row and the column may become an odd number. Where, in the minor matrix thus picked out, the dot domain has any of the constructions shown in FIGS. 4A – 4H, the interpolation is performed in such a way that a dot is formed at a part $d$ of the non-dot domain $a_{n,m}$ between dot domains $b_1$ and $b_2$. Generally speaking, in an arbitrary matrix of three rows and three columns of five display components and four non-display components, when there is satisfied such a condition that the aforementioned three display components—the first, second and third display components—are formed in an oblique direction and that the other remaining two display components are formed in a row or column direction and the one display component adjoins the aforementioned one display component and that the angle between the aforementioned oblique and row or column directions is within 90°, the non-display component, which adjoins the first and second display components, is displayed. When this is applied to FIG. 2, the corresponding domain is [5, 2]. Therefore, in FIG. 3 in which the original character is magnified double, a dot $d_0$ is formed in the enlarged domain $a_{5,2}$ of the domain [5, 2] in FIG. 2.

In the manner described above, the matrix of 3 rows and 3 columns is supposed by taking note of any one dot domain, and whether or not the interpolation is necessary is then determined.

By the foregoing first interpolation rule, the clearness of the character is somewhat enhanced. By further applying the second interpolation rule to be explained hereunder, the character can be reproduced in good conformance to the original shape intended as the character.

In FIG. 2, notice is taken of any one non-dot domain $[p, q]$, and a minor matrix of 2 rows and 2 columns including the non-dot domain $[p, q]$ is supposed. The non-dot domain is denoted by $a_{n,m}$ ($n$ and $m$ indicate Nos. of the row and the column, respectively), while the matrix of 2 rows and 2 columns is denoted by:

$$\begin{pmatrix} a_{n-1, m} & a_{n-1, m+1} \\ a_{n, m} & a_{n, m+1} \end{pmatrix}$$

Where, in the matrix, the domain $a_{n-1, m+1}$ corresponding to the non-dot domain $a_{n, m}$ is of the non-dot domain and the domains $a_{n-1, m}$ and $a_{n, m+1}$ have dots, the interpolation is performed at a part of the non-dot domain $a_{n, m}$ on the side of the dot domains $a_{n-1, m}$ and $a_{n, m+1}$. In cases other than the above condition, no interpolation is carried out.

FIGS. 5A – 5D indicate all the positional relations between non-dot domains $C_1 - C_4$ and dot domains $b_1$, $b_2$, and interpolations at those times. When the second interpolation rule is applied to FIG. 2, the interpolation is executed at [1, 5], [2, 4], [3, 4], [4, 5], [5, 4], [6, 3], [7, 4] and [6, 5] in the figure.

Figures 8, 9, 10, 11:
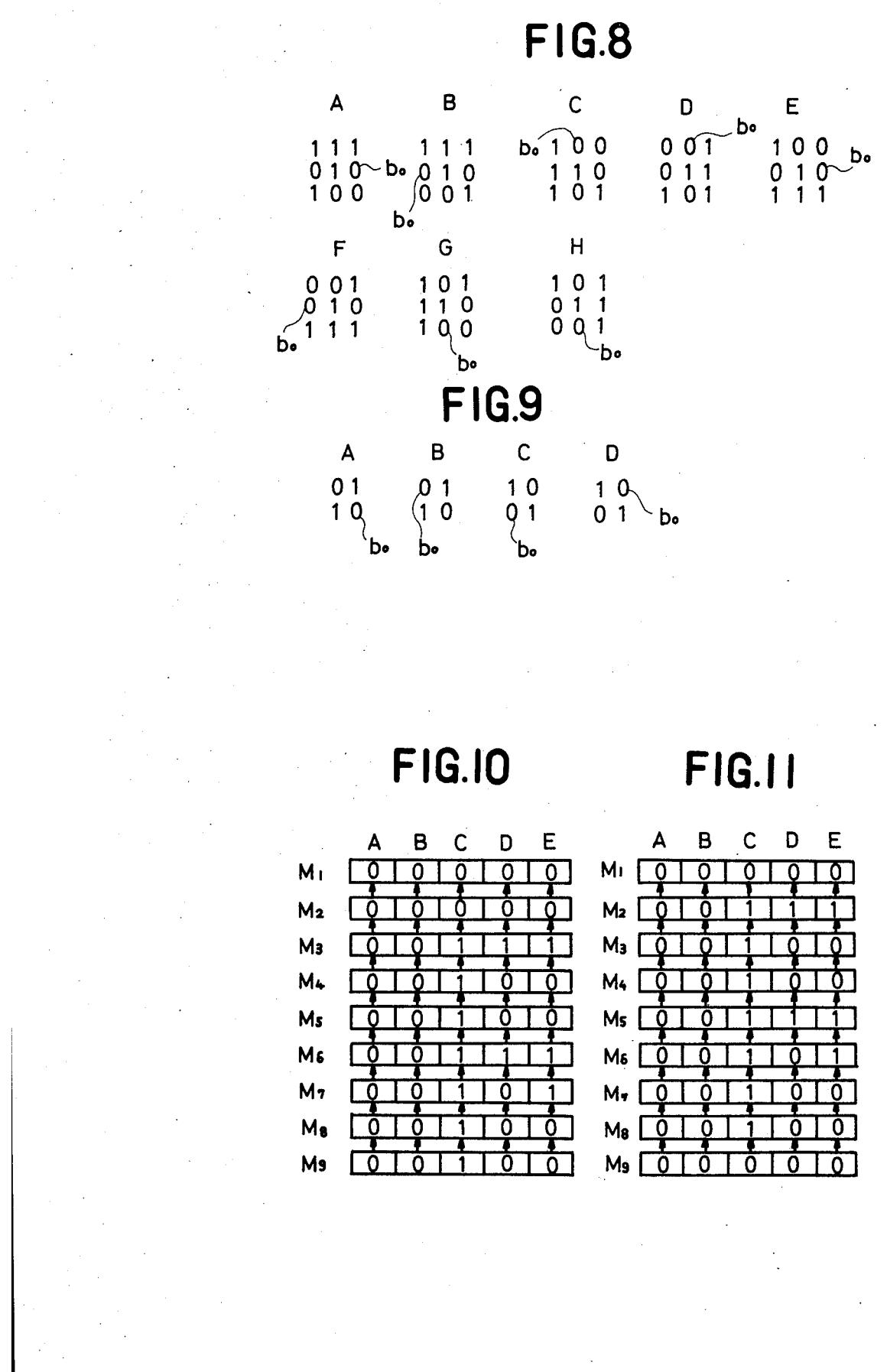

Referring now to FIGS. 6 to 11, description will be made of an apparatus which effects the enlargement and interpolation of a character formed of dots. In FIG. 6A, a keyboard K is made up of key switches indicative of letters, numerals, symbols etc. Various data put in by these keys are transmitted to predetermined buffer registers by a multiplexer D. The register $R_1$ stores the magnification number of the character. The register $R_2$ stores the data of the character, one word of which is read out and written into the register $R_3$. An arithmetic circuit AD shown in FIG. 6B executes the addition and subtraction between various count contents and stored contents. Registers $R_4$ and $R_5$ store specific operation outputs of the arithmetic circuit AD. A register $R_6$ temporarily stores outputs of a counter $C_4$. A register $R_7$ stores bits corresponding to recorded dots, and it has a memory capacity of 7 bits in this example. A character generator CG in FIG. 6C has the function of the data of each character into a bit pattern for conducting a dot recording in accordance with a preset program. A shift register M which stores outputs of the character generator CG is composed of shift registers $M_1 - M_9$, and can shift the contents vertically and horizontally on the drawing. A supplement detecting circuit U detects the necessity for the interpolations on the basis of the original character bit pattern, and the details are illustrated in FIG. 11. The circuit U takes out the respective outputs of the bit pattern stored in the register M, and logically detects the first and second interpolations. A register $R_8$ stores a specific operation output of the arithmetic circuit AD. A counter $C_1$ is septenary, while a counter $C_2$ is a preset counter in which "7" is set. A coincidence circuit $P_1$ shown in FIG. 6A detects the coincidence between the counter $C_1$ and the counter $C_2$, and provides an output when both the numerical values coincide. A counter $C_3$ counts the coincidence output at that time. The counter $C_4$ in FIG. 6B counts the magnification of the enlargement character in the vertical direction. A timing counter $C_5$ in FIG. 6C is quinary, and generates timing pulses at terminals $d_1 - d_5$ in sequence. A counter $C_7$ in FIG. 6E is a preset counter in which "5" is set. When a counter $C_6$ counts "5," a coincidence circuit $P_3$ provides an output. A counter $C_8$ in FIG. 6F is decimal, and supplies an output to a coincidence circuit $P_4$. A counter $C_9$ is a preset counter in which "9" is set. When the output of the counter $C_8$ coincides with the set value of the counter $C_9$, the coincidence circuit $P_4$ provides an output. A decoder DC in FIG. 6G is so set as to produce when the magnification of the character is "1," "7," "14," .... A coincidence circuit $P_5$ is a circuit which detects the coincidence between the output of the counter $C_8$ and that of the register $R_8$. Monostable multivibrators (hereinbelow abbreviated to "monomulti.") $N_1 - N_{14}$ are employed for making timings of outputs and for shaping waveforms. Reference symbol DL designates a delay circuit, reference symbols $F_1 - F_3$ designate S-R flip-flop circuits, and reference symbols $G_1 - G_{162}$ designate gates reference symbol. DR indicates a driving device of a wire dot printer. In this embodiment, it is illustrated as a device where dots are formed by seven pins as it is moving in the lateral direction. The supplement detecting circuit in FIG. 6C will be explained in more detail. Responsive logical values of memory locations (1A – 1E) - (9A – 9E) of the registers $M_1 - M_9$ in FIG. 6C are supplied to input terminals of the gates indicated by the same symbols in FIG. 6H.

FIG. 6H logically represents the first and second interpolation rules. The details will be explained hereunder.

As regards the first interpolation rule, the matrix of 3 rows and 3 columns is assumed to be:

$$\begin{pmatrix} b_{p,q} & b_{p,q+1} & b_{p,q+2} \\ b_{p+1,q} & b_{p+1,q+1} & b_{p+1,q+2} \\ b_{p+2,q} & b_{p+2,q+1} & b_{p+2,q+2} \end{pmatrix}$$

and the bit of which notice is taken in assumed to be $b_{p+1,q}$. Then, the bit $b_{p+1,q}$ is converted into "1" when the following relation (1) is satisfied:

$$\overline{b_{p+1,q}} \cdot \overline{b_{p+1,q+2}} \cdot b_{p,q+2} \cdot b_{p+1,q+1} \cdot$$
$$b_{p+2,q+2} \cdot (\overline{b_{p+2,q+1}} \cdot \overline{b_{p+2,q}} + b_{p,q} \cdot b_{p,q+1}) \times (\overline{b_{p+2,q}}$$
$$\cdot \overline{b_{p+2,q+1}} + \overline{b_{p,q}} \cdot \overline{b_{p,q+1}}) = 1 \quad (1)$$

Assuming the noticed bit to be $b_{p,q+1}$, it is converted into "1" when the following relation (2) is fulfilled:

$$\overline{b_{p,q+1}} \cdot \overline{b_{p+2,q+1}} \cdot b_{p+1,q+1} \cdot b_{p+2,q+2} \cdot$$
$$b_{p+2,q} \cdot (\overline{b_{p,q}} \cdot \overline{b_{p+1,q}} + \overline{b_{p,q+2}} \cdot \overline{b_{p+1,q+2}}) \times (b_{p,q} \cdot b_{p+1,q} + b_{p,q+2} \cdot b_{p+1,q+2}) = 1 \quad (2)$$

Assuming the noticed bit to be $b_{p+1,q+2}$, it is converted into "1" when the following relation (3) is fulfilled:

$$\overline{b_{p+1,q+2}} \cdot \overline{b_{p+1,q}} \cdot b_{p,q} \cdot b_{p+1,q+1} \cdot b_{p+2,q} \cdot (\overline{b_{p,q+1}} \cdot \overline{b_{p,q+2}} + \overline{b_{p+2,q+1}} \cdot \overline{b_{p+2,q+2}}) \times (b_{p,q+1} \cdot b_{p,q+2} + b_{p+2,q+1} \cdot b_{p+2,q+2}) = 1 \quad (3)$$

Assuming the noticed bit to be $b_{p+2,q+1}$, it is converted into "1" when the following relation (4) is fulfilled:

$$\overline{b_{p+2,q+1}} \cdot \overline{b_{p,q+1}} \cdot b_{p,q} \cdot b_{p+1,q+1} \cdot b_{p,q+2} \cdot (\overline{b_{p+1,q}} \cdot \overline{b_{p+2,q}} + \overline{b_{p+1,q+2}} \cdot \overline{b_{p+2,q+2}}) \times (b_{p+1,q} \cdot b_{p+2,q} + b_{p+1,q+2} \cdot b_{p+2,q+2}) = 1 \quad (4)$$

The matrix of 2 rows and 2 columns is assumed to be:

$$\begin{pmatrix} a_{p,q} & a_{p,q+1} \\ a_{p+1,q} & a_{p+1,q+1} \end{pmatrix}$$

and the bit of which notice is taken is assumed to be $a_{p+1,q}$ or $a_{p,q+1}$. Then, the bit $a_{p+1,q}$ or $a_{p,q+1}$ is converted into "1" when the following relation is established:

$$\overline{a_{p+1,q}} \cdot \overline{a_{p,q+1}} \cdot a_{p,q} \cdot a_{p+1,q+1} = 1$$

Assuming the noticed bit to be $a_{p,q}$ or $a_{p+1,q+1}$, it is converted into "1" when the following relation is established:

$$\overline{a_{p,q}} \cdot \overline{a_{p+1,q+1}} \cdot a_{p+1,q} \cdot a_{p,q+1} = 1$$

Accordingly, when the noticed bit is "0" and the following equation is met, the noticed bit is converted into "1."

$$\overline{a_{p+1,q}} \cdot \overline{a_{p,q+1}} \cdot a_{p,q} \cdot a_{p+1,q+1} + \overline{a_{p,q}} \cdot \overline{a_{p+1,q+1}} \cdot a_{p+1,q} \cdot a_{p,q+1} = 1 \quad (5)$$

The foregoing logical relations 81) – (5) in the case where the noticed bit is stored in the location 3C of the register $M_3$ are configured by the logic circuit in FIG. 6H The operation will now be explained. The explanation is of a case where the original pattern of the letter "R" in FIG. 2 is magnified double as shown in FIG. 3 and where it is printed after conducting the interpolation processings.

Figure 6A:
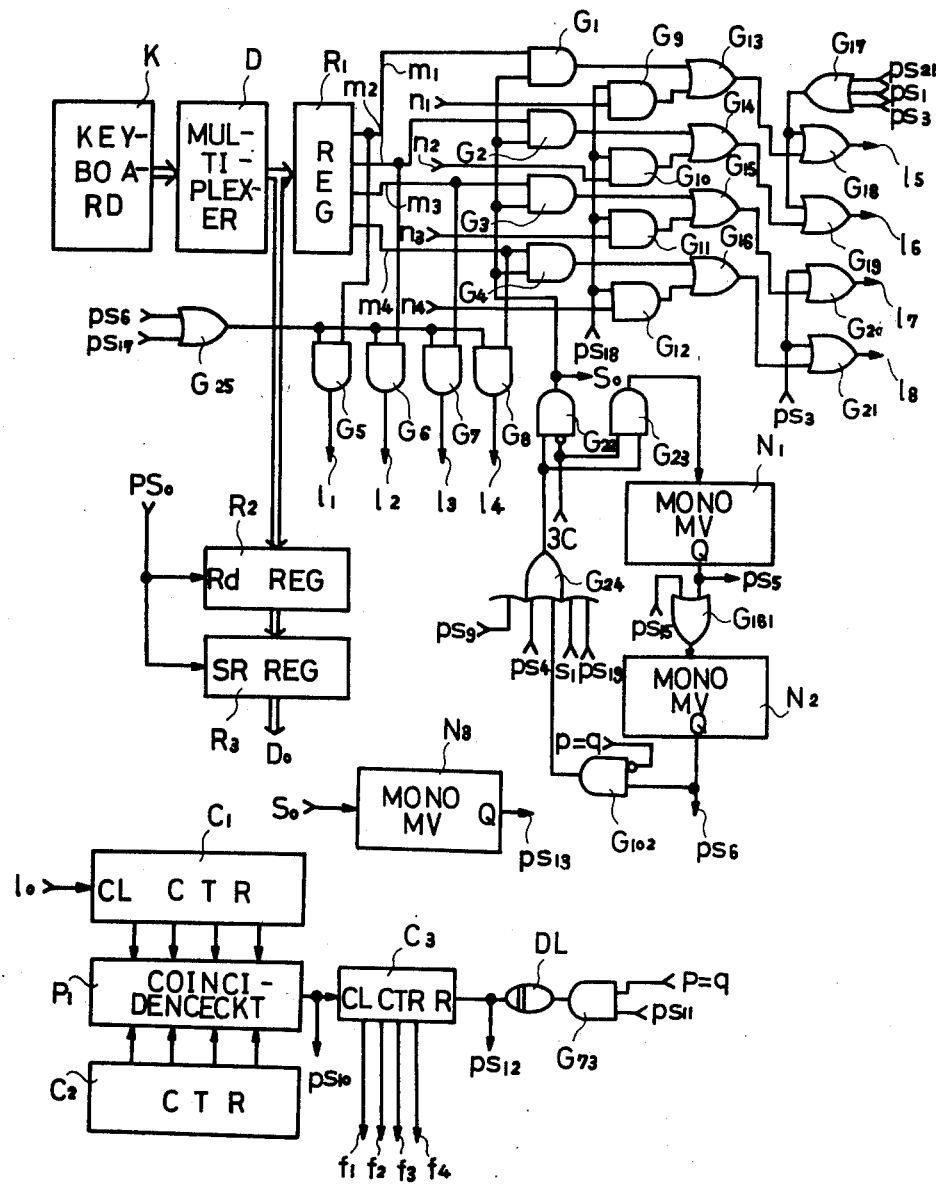

In FIG. 6A, the magnification "2" of the character and the data of the character corresponding to rows for the printing are received as inputs from the keyboard K, and they are written through the multiplexer D into the register $R_1$ for the magnification and the register $R_2$ for the data, respectively. Upon a print order $PS_0$ from the keyboard K side, the character "R" is read out from the register $R_2$ and is transferred to the register $R_3$ having a capacity of one word. An output $D_0$ from the register $R_3$ is put into the character generator CG shown in FIG. 6C, and is converted into a bit pattern of FIG. 7 in which "1" corresponds to the dot in FIG. 2 and "0" corresponds to the null dot. Simultaneously therewith, the output $PS_0$ triggers the monomulti $N_4$ through the gate $G_{162}$ in FIG. 6C. An output $PS_1$ from the monomulti $N_4$ is fed through the gates $G_{17} - G_{19}$ to 2 inputs of the arithmetic circuit AD, to supply logical values (1, 1). The other 2 inputs of the arithmetic circuit AD, i.e., outputs from the gates $G_{20}$ and $G_{21}$, are in the state of (0, 0). As a result, the inputs of the arithmetic circuit AD on one side are supplied with (0 0 1 1), i.e., "3". Further, the output $PS_1$ opens the gates $G_{30} - G_{33}$ in FIG. 6B and feeds (0 0 0 0) of outputs $a_1 - a_4$ of the cleared counter $C_6$ in FIG. 6E to the arithmetic circuit AD. Consequently, "3" appears at outputs $b_1 - b_4$ of the arithmetic circuit AD. On the other hand, the output $PS_1$ writes the above "3" into the register $R_5$ in FIG. 6B by an output $PS_2$ having passed through the gate $G_{83}$. An output from the register $R_5$ designates the third column of the character generator CG in FIG. 6C. Accordingly, the data of the third column of the bit pattern in FIG. 7 are provided as outputs. The reason why the third column of the bit pattern of the letter "R" is first read out is as stated below. In both the first and second interpolation rules previously described, when any one null dot domain is noticed and the presence or absence of the dot in the surrounding domains is in the prescribed relation, the interpolation is carried out for the null dot domain noticed. In the present embodiment, the presence and absence of the dot correspond to the logical values "1" and "0", respectively. The noticed bit is shifted to the predetermined location in the register. Where the logical value of bit stored in the location is discerned and if the logical value is "0" it is determined by the supplement detecting circuit U whether or not the surrounding bit construction falls under the first or second interpolation rule. FIGS. 8 and 9 show bit patterns of the logical values "1" and "0" into which the patterns of the cases of performing the interpolations as previously indicated by the dots are converted. A bit $b_0$ represents the bit of which notice is taken. Data bits at every column ob the bit pattern read out from the character generator CG are stored in the registers $M_3 - M_9$ in FIG. 6C. In the present embodiments, the noticed bit is shifted to the location 3C of the register $M_3$, and the correlations of the bit with the surrounding bits are investigated.

Figure 6B:
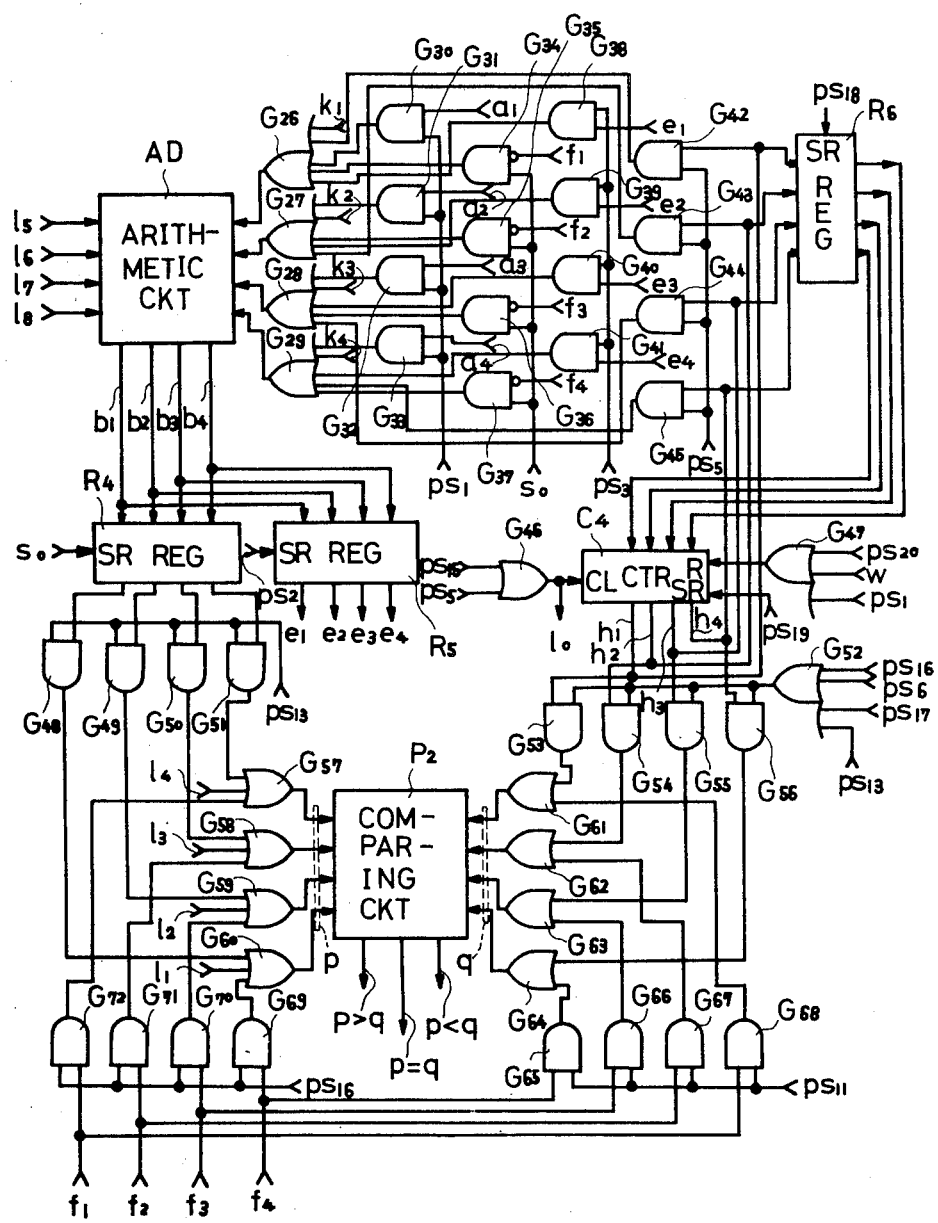

Returning to the previous explanation, the third column of the bit pattern in FIG. 7 as stored in the character generator CG is designated by outputs $e_1 - e_4$ of the register $R_5$ in FIG. 6B. Data bits (1 0 0 1 1 0 0) of the third column in the figure are supplied through the gates $G_{74} - G_{80}$ to the registers $M_3 - M_9$. On the other hand, the counter $C_5$ is incremented by "1" by the output $PS_2$ and provides an output at its terminal $d_1$. The output becomes lateral shift signals of the registers $M_1 - M_9$ through the gates $G_{85}$ and $G_{84}$. Therefore, the data bits of the third column are transferred to the locations 3A - 9A of the registers $M_3 - M_9$. The reason why the registers $M_1$ and $M_2$ are provided here is that, in the first interpolation rule, at most 2 bits are required as the detection object bits for the upper 2 rows of the noticed bit. Subsequently, the monomulti $N_5$ is triggered by the output of the terminal $d_1$. An output $PS_3$ from the monomulti is supplied to the one-side inputs of the arithmetic circuit AD through the gates $G_{17}$, $G_{18}$, $G_{19}$ and the gates $G_{20}$, $G_{21}$ in FIG. 6A. On the other hand, the output $PS_3$ opens the gates $G_{38} - G_{41}$ in FIG. 6B and supplies "3" or (0 0 1 1) of the outputs $e_1 - e_4$ to the inputs of the arithemtic circuit AD on the other side. Consequently, (0 0 1 0) or "2" appears at the outputs of the arithmetic circuit AD, and it is written into the register $R_5$ by the output $PS_2$ obtained by passing the output $PS_3$ through the gate $G_{83}$. Data bits of the second column of the bit pattern of "R" in FIG. 7 are designated by the outputs $e_1 - e_4$ of the register $R_5$, and are supplied to the registers $M_3 - M_9$. By the output $PS_2$, the counter $C_5$ is incremented by "1" and becomes "2" in the count value. Contents of the registers $M_3 - M_9$ are shifted by the output of the terminal $d_2$ thereof, so that the data bits of the third column are transferred to the locations 3B - 9B of the registers $M_3 - M_9$, while the data bits of the second column are transferred to the locations 3A - 9A. Likewise, the data bits of the first column are transferred to the locations 3A - 9A of the registers $M_3 - M_9$. The subsequent values of the outputs $e_1 - e_4$ close the gates $G_{74} - G_{80}$ through the gates $G_{81}$ and $G_{82}$, and supply "O" to inputs of the registers $M_3 - M_9$. Therefore, the stored contents in the registers $M_3 - M_9$ become as in FIG. 10 by five times of shifts in all. When notice is taken of the stored contents of the location 3C of the register $M_3$ in FIG. 6C, i.e., [$M_3$, C] in FIG. 10, the bit is "1" and hence it does not become the object of the interpolations. The output "1" of the location 3C of the register $M_3$ in FIG. 6C closes the gate $G_{22}$ in FIG. 6A, and simultaneously opens the gate $G_{23}$. At this time, an output $PS_4$ of the monomulti $N_6$ triggered by the shift pulse from the last terminal $d_5$ of the timing counter $C_5$ having shifted the registers $M_1 - M_9$ five times is fed through the gate $G_{24}$ to another input of the gate $G_{23}$. An output from the gate $G_{23}$ triggers the monomulti $N_1$, an output $PS_5$ of which is supplied to the gate $G_{96}$ in FIG. 6D. Since the gate $G_{96}$ is opened by the output of the location 3C of the register $M_3$, the output of the gate $G_{23}$ passes therethrough and is supplied to the shift register $R_7$ of 7 bits. It is written into a location $X_1$ of the register $R_7$ by the output $PS_5$. On the other hand, the output $PS_5$ increments the counter $C_4$ by "1" through the gate $G_{46}$ in FIG. 6B. Outputs $h_1 - h_4$ of the counter $C_4$ having counted "1" are supplied to the gates $G_{53} - G_{56}$. Since the gates $G_{53} - G_{56}$ are opened by an output $PS_6$ of the monomulti $N_2$ in FIG. 6A as triggered by the output $PS_5$, the outputs are supplied through the gates $G_{61} - G_{64}$ to inputs $q$ of the comparing circuit $P_2$ on one side thereof. Since the gates $G_5 - G_8$ are opened by the output $PS_6$, the magnification "2" stored in the register $R_1$ is supplied through the gates $G_{57} - G_{60}$ to inputs $p$ of the comparing circuit $P_2$ on the other side thereof. The magnification "2" is not coincident with the count value "1" of the counter $C_4$, so that the coincidence output $p = q$ of the comparing circuit $P_2$ does not change. The output $PS_5$ is supplied through the OR gate $G_{46}$ to the counter $C_1$ in FIG. 6A, and "1" is counted.

The output $PS_6$ of the monomulti $N_2$ in FIG. 6A is supplied through the gate $G_{24}$ to the gate $G_{23}$. Since the contents "1" of the location 3C of the register $M_3$ remain unchanged, the gate $G_{23}$ is open, and the output $PS_6$ passes through the gate $G_{23}$ to trigger the monomulti $N_1$ and to generate the output $PS_5$ again. This output $PS_5$ opens the gate $G_{96}$ in FIG. 6D, and writes the output "1" of the location 3C of the register $M_3$ into the location $X_1$ of the register $R_7$ through the gate $G_{97}$. In consequence, "1" and "1" are respectively stored in the locations $X_1$ and $X_2$ of the register $R_7$. On the other hand, the output $PS_5$ increments the contents of the counter $C_1$ by "1" through the gate $G_{45}$, to render the count contents "2" by the addition with the previous contents "1". The second output $PS_5$ is supplied to the counter $C_4$, to render the count contents "2." The count outputs $h_1 - h_4$ are supplied to the one-side inputs $q$ of the comparing circuit $P_2$ through the gates $G_{53} - G_{56}$ kept open by the output $PS_6$ of the monomulti $N_2$ in FIG. 6A, and to the other-side inputs $p$ of the comparing circuit $P_2$ through the gates $G_5 - G_8$ kept open by the output $PS_6$ of the magnification number "2" of the register $R_1$ and further through the gates $G_{57} - G_{60}$. Since both the objects of the comparison are "2", an output "1" is produced at the output $p = q$ of the comparing circuit $P_2$. An output $w$ consequently provided from the gate $G_{101}$ in FIG. 6F resets the counter $C_4$ through the gate $G_{47}$ in FIG. 6B. On the other hand, the output $w$ triggers the monomulti $N_{10}$ and generates an output $PS_7$. The output $PS_7$ increments the counter $C_8$ by "1" through the gate $G_{103}$ by an output $PS_8$. Further, the output $PS_8$ is applied as a vertical shift pulse for the registers $M_1 - M_9$ in FIG. 6C, so that the contents of the registers $M_1 - M_9$ of lower digits are transferred to the registers of higher digits and that the contents of the registers $M_1 - M_9$ become as in FIG. 11. Accordingly, the bit [2, 1] in the bit pattern of FIG. 7 is stored in the location 3C of the register $M_3$, and it becomes the bit of which notice is taken. Then, the output $PS_7$ triggers the monomulti $N_{11}$ in FIG. 6F and produces an output $PS_9$. The output $PS_9$ is supplied through the gate $G_{24}$ to the gate $G_{23}$ in FIG. 6A.

Figure 6D:
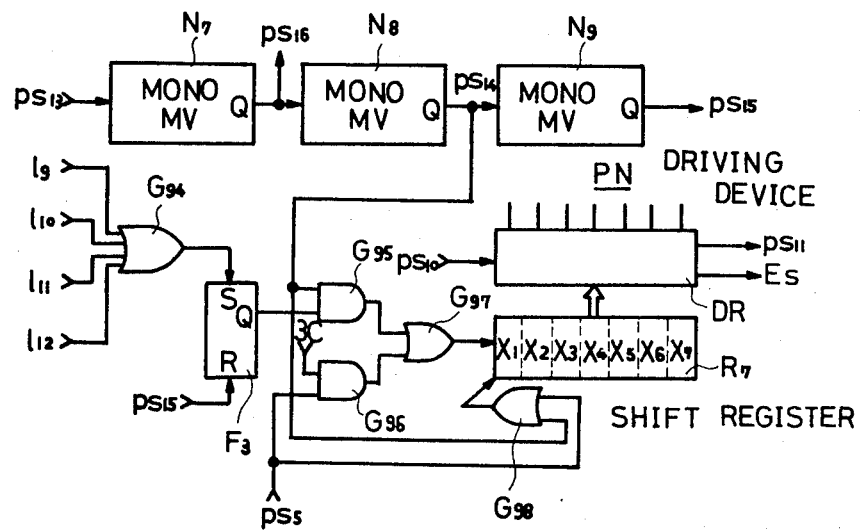

Thereafter, in quite the same way as in the foregoing, "1" and "1" are stored in the register $R_7$ in FIG. 6D. When 7 bits, i.e., bits corresponding to dots of [1, z] (z denotes an integer from 1 to 7) in FIG. 3 are stored in the register $R_7$ in this way, an output "7" is provided from the counter $C_1$. Since it coincides with "7" stored in the preset counter $C_2$, a coincidence output $PS_{10}$ is provided from the coincidence circuit $P_1$ in FIG. 6A and increments the counter $C_3$ by "1". Simultaneously therewith, the wire driving device DR in FIG. 6D is actuated by the coincidence output $PS_{10}$. The respective wires are driven in correspondence with the stored contents of the register $R_7$. A wire head continues to move. Since all the stored contents are "1", all the wires PN are driven to form 7 dots of the first column in FIG. 3. On the other hand, after the output $PS_{10}$ is supplied to the wire driving device DR, an output $PS_{11}$ is generated from the device DR. Thus, the gates $G_{65} - G_{68}$ in FIG. 6B are opened, so that "1" of outputs $f_1 - f_4$ of the counter $C_3$ in FIG. 6A is supplied through the gates $G_{61} - G_{64}$ to the one-side inputs $q$ of the comparing circuit $P_2$. The magnification "2" passing through the gates $G_5 - G_8$ in FIG. 6A as also opened by the output $PS_{11}$ is supplied through the gates $G_{57} - G_{60}$ in FIG. 6B to the other-side inputs $p$ of the comparing circuit $P_2$. Since the two comparing values are different, the output state $p = q$ of the comparing circuit does not change. Accordingly, an output is provided from the gate $G_{108}$ in FIG. 6F and sets the flip-flop circuit $F_1$. An output of the flip-flop opens the gate $G_{105}$, so that an output of the clock pulse generator CL is supplied through the gate $G_{104}$ as well as the gate $G_{103}$ to the counter $C_8$. Since the counter $C_8$ has already counted three shift pulses, i.e., the output $PS_8$, its contents are "3". When 6 clock pulses are further supplied, the count value of the counter $C_8$ becomes "9", which coincides with the numerical value "9" of the counter $C_9$ preset by the coincidence circuit $P_4$. With the coincidence output $S_1$, the counter $C_8$ is reset through the gate $G_{107}$. Simultaneously, the flip-flop circuit $F_1$ is reset to close the gate $G_{105}$, so that the supply of the clock pulses to the counter $C_8$ is stopped. Since the 6 pulses having passed through the gate $G_{103}$ are supplied as the vertical shift pulses of the registers $M_1 - M_9$ in FIG. 6C, the contents of the respective registers are successively shifted from the lower digits to the higher digits six times. This is carried out in order to return the contents of the registers $M_1 - M_9$ to the bit construction of FIG. 10 as has firstly been stored in the register $M_3$. That is, by shifting the contents nine times from the first stored state, the first stored contents are established again. Then, dots of the magnification in the lateral direction, i.e., dots of [y, 2] (y denotes an integer from 1 to 7) in FIG. 3 are formed in the same way as in the foregoing. At the termination of the formation of the dots, the count value of the counter $C_3$ shown in FIG. 6A is "2", and the count output is compared with the magnification "2" by the comparing circuit $P_2$. Since the two numerical values are coincident, the output $p = q$ of the comparing circuit $P_2$ changes, and the gate $G_{73}$ is opened to reset the counter $C_3$. An output $PS_{12}$ from the gate $G_{73}$ in FIG. 6A increments the counter $C_6$ in FIG. 6E by "1". The count value of the counter $C_6$ serves to detect the termination of the last column of the bit pattern.

The output $PS_{12}$ triggers the monomulti $N_{12}$ and supplies its output to the gate $G_{99}$. Under this state, no output is provided from the coincidence circuit $P_3$, so that the gate $G_{99}$ is open. An output $PS_{21}$ is accordingly provided from the gate $G_{99}$. The output $PS_{21}$ increments the count value of the counter $C_5$ by "1" through the monomulti $N_4$ and the gate $G_{83}$ in FIG. 6C. The output of the arithmetic circuit AD is transferred to the register $R_2$ by the output $PS_2$ of the gate $G_{83}$. The column designation for the character generator CG is conducted by the output of the register. The second column in FIG. 7 is read out from the character generator CG so as to be stored in the locations 3C – 9C of the registers $M_3 - M_9$.

Thereafter, the dot is formed or the null dot is established in the same way as described previously.

Figure 6E:
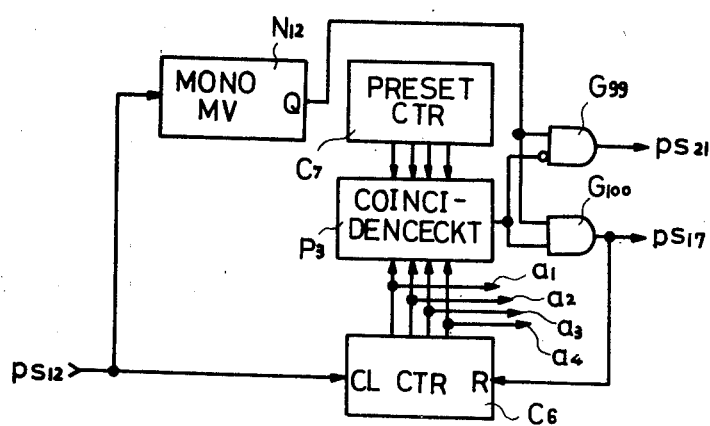

When the processing proceeds as in the above and the count value of the counter $C_6$ in FIG. 6E becomes "3", the enlargement dots up to the third column of the dot pattern in FIG. 2 or the dots up to the sixth column in FIG. 3 are constructed. In the fourth column in FIG. 7, a part requiring interpolation exists. Description will now be made of the dot formation of this column. Dots at [1, 7] and [2, 7] in FIG. 3 are formed in the same way as previously stated. Subsequently, the bit "0" of [2, 4] in FIG. 7 is transferred to the location 3C of the register $M_3$. Then, the output 3C of the register $M_3$ is "0", so that the gate $G_{23}$ shown in FIG. 6A is closed while the gate $G_{22}$ is opened. Under this state, the counter $C_4$ exhibits a count value "0", the counter $C_1$ "2", the counter $C_8$ "1", and the counter $C_3$ "0". When the gate $G_{22}$ is opened, the output $PS_9$ of the monomulti $N_{11}$ in FIG. 6F opens the gates $G_1 - G_4$ through the gates $G_{24}$, $G_{22}$ in FIG. 6A and by an output $S_O$ from the gate $G_{22}$.

In consequence, the magnification "2" stored in the register $R_1$, i.e., the output (0 0 1 0), is supplied through the gates $G_1 - G_4$ and $G_{13} - G_{16}$ to the inputs of the arithmetic circuit AD on one side thereof. The output $S_O$ opens the gates $G_{34} - G_{37}$ in FIG. 6B to convert the count value (0 0 0 0) of the counter $C_3$ into its 2's complement (1 1 1 1), which is supplied to the inputs of the arithmetic circuit AD on the other side thereof. At the output of the arithmetic circuit AD, accordingly, (0 0 0 1) appears, which is transferred to the register $R_4$ by the output $S_O$. The output $S_O$ triggers the monomulti $N_3$ in FIG. 6A and produces an output $PS_{13}$. Thus, the gates $G_{48} - G_{51}$ in FIG. 6B are opened, so that the stored contents (0 0 0 1) of the register $R_4$ are supplied through the gates $G_{48} - G_{51}$ and the gates $G_{57} - G_{60}$ to the one-side inputs $p$ of the comparing circuit $P_2$. The output $PS_{13}$ also opens the gates $G_{53} - G_{56}$ through the gate $G_{52}$, so that the count values (0 0 0 0) of the counter $C_4$ are supplied through the gates $G_{61} - G_{64}$ to the other-side inputs $q$ of the comparing circuit $P_2$. Since the values of the comparing inputs differ, an output p > q of the comparing circuit $P_2$ changes and the gates $G_{87}$ and $G_{88}$ shown in FIG. 6C are opened.

The bit contents stored in the registers $M_1 - M_9$ shown in FIG. 6C bring the outputs $u_1 - u_4$ of the supplement detecting circuit in FIG. 6C into "0," which signifies that no interpolation is necessary. Accordingly, the output of the gate $G_{91}$ formerly opened becomes "0." Further, an output p < q of the comparing circuit $P_2$ in FIG. 6B changes by the function of the output $PS_{16}$ of the monomulti $N_7$ in FIG. 6D as triggered by the output $PS_{13}$. The details of this operation will be made apparent in the operation of the interpolation to be described later. The gates $G_{86}$ and $G_{89}$ are opened by the output p < q, and the gates $G_{92}$ and $G_{93}$ are opened by the output $PS_{16}$. Since the output $u_3$ is "0," the output of the gate $G_{92}$ becomes "0." The output $PS_{16}$ triggers the monomulti $N_8$ to provide an output $PS_{14}$. Since the contents "0" in the location 3C of the register $M_3$ are supplied through the gates $G_{96}$ and $G_{97}$ to the input of the register $R_7$, they are written into the register $R_7$ by the output $PS_{14}$. The register $R_7$ has formerly stored the bits "1" and "1" corresponding to the dots of [1, 7] and [2, 7] shown in FIG. 3, so that (0, 1, 1) are stored in the locations ($X_1$, $X_2$, $X_3$). On the other hand, the output $PS_{14}$ triggers the monomulti $N_9$ to generate an output $PS_{15}$. The output $PS_{15}$ adds "1" to the counter $C_4$ and the counter $C_1$ through the gate $G_{46}$ illustrated in FIG. 6B. Consequently, the counter $C_4$ becomes "1", and the counter $C_1$ "3".

Thereafter, the output $PS_{15}$ is supplied to the gate $G_{161}$ in FIG. 6A. The same operation as previously explained is again conducted through the monomulti $N_2$, the gate $G_{102}$ and the gate $G_{24}$.

Thereafter, the bits "1" and "0" corresponding to the dots and the null dots of [q, 7] (q denotes an integer from 4 to 7) in FIG. 3 are written into the register $R_7$ in FIG. 6D in the same manner. When the stored contents of the register $R_7$ become (1, 0, 0, 0, 0, 1, 1), the count value of the counter $C_1$ shown in FIG. 6A becomes "7," and an output $PS_{10}$ is provided from the coincidence circuit $C_2$. The wire driving device DR shown in FIG. 6D is driven to form the dots [1, 7], [2, 7] and [7, 7] in FIG. 3.

Figure 6F:
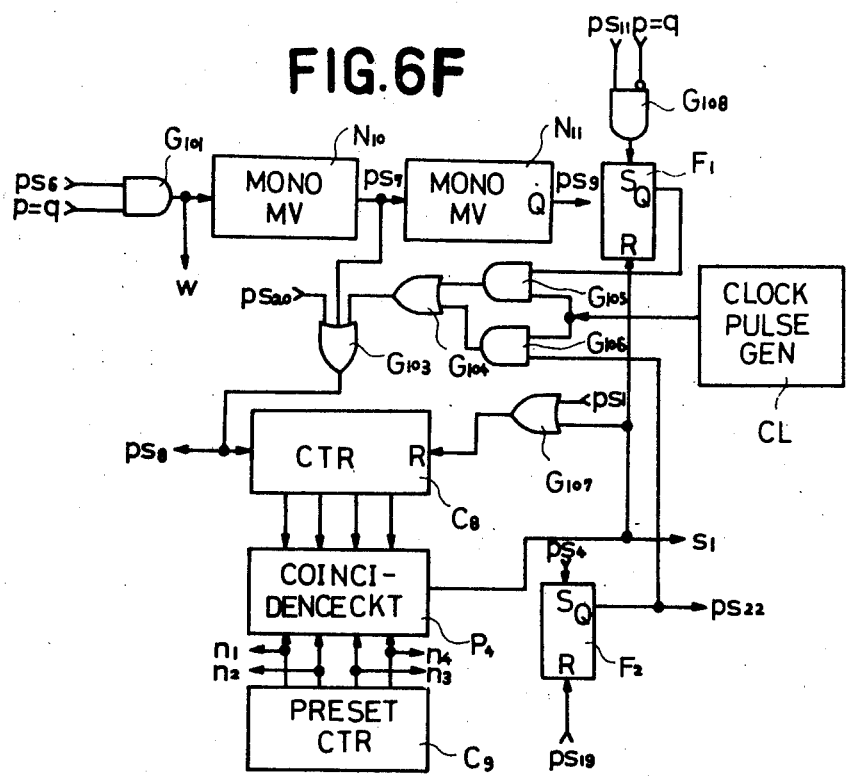

Subsequently, the dot formation for the eighth column in FIG. 3 is initiated. Since the dot requiring no interpolation has been already explained, [3, 8] in FIG. 3 as requires the interpolation will be described. The bits corresponding to the dots [1, 8] and [2, 8] have been already stored in the register $R_7$ illustrated in FIG. 6D, and the bit of the location 3C of the register $M_3$ shown in FIG. 6C is made "0". The contents of the various counters under this state are to be stated below. The counter $C_4$ shown in FIG. 6B is of "0", the counter $C_1$ in FIG. 6A is of "2", the counter $C_8$ in FIG. 6F is of "1", the counter $C_3$ in FIG. 6A is of "1", and the counter $C_6$ in FIG. 6E is of "3". The stored value "0" of the location 3C of the register $M_3$ shown in FIG. 6C opens the gate $G_{22}$ illustrated in FIG. 6A. By the output $S_O$, the gates $G_1 - G_4$ are opened so that the stored magnification "2" of the register $R_1$ is supplied onto one input side of the arithmetic circuit AD. By the output $S_O$, the gates $G_{34} - G_{37}$ are opened so that the 2's complement (1, 1, 1, 0) of the count value "1" or (0, 0, 0, 1) of the counter $C_3$ shown in FIG. 6A is supplied onto the other input side of the arithmetic circuit AD. At the output of the arithmetic circuit AD, accordingly, (0, 0, 0, 1) appear, which are supplied to the one-side inputs p of the comparing circuit $P_2$ through the gates $G_{48} - G_{51}$ opened by the output $PS_{13}$ of the monomulti $N_3$ triggered by the output $S_O$ and further through the gates $G_{57} - G_{60}$. The output $PS_6$ opens the gates $G_{53} - G_{56}$ through the gate $G_{52}$, to supply the count value "0" of the counter $C_4$ to the other-side inputs q of the comparing circuit $P_2$. The two comparing inputs become "1" and "0", the output p > q of the comparing circuit $P_2$ changes, and the gates $G_{87}$ and $G_{88}$ illustrated in FIG. 6C are opened. Here, the outputs ($u_1$, $u_2$, $u_3$, $u_4$) of the supplement detecting circuit U indicate (0, 0, 0, 1), respectively. This is obvious by introducing the respective logical values "1" and "0" of the registers $M_1 - M_9$ into the detailed detector circuit shown in FIG. 6H. Then, outputs "0" are provided from the gates $G_{87}$ and $G_{88}$. Further, the gates $G_{90}$ and $G_{91}$ are opened by the output $PS_{13}$. Since the output of the gate $G_{87}$ is "0", that of the gate $G_{91}$ becomes "0". Subsequently, the output $PS_{16}$ of the monomulti $N_7$ triggered by the output $PS_{13}$ opens the gates $G_{69} - G_{72}$ shown in FIG. 6B, to supply the count value "1" of the counter $C_3$ to the one-side inputs p of the comparing circuit $P_2$. Simultaneously therewith, the output $PS_{16}$ opens the gates $G_{53} - G_{56}$, to supply the count value "0" of the counter $C_4$ to the other-side inputs q of the comparing circuit $P_2$. The comparing objects are "1" and "0", an output is provided at p < q of the comparing circuit $P_2$, the gates $G_{86}$ and $G_{89}$ shown in FIG. 6C are opened, and "1" of the output $u_4$ of the supplement detecting circuit U appears at the output of the gate $G_{89}$. Since, here, the gates $G_{92}$ and $G_{93}$ are kept open by the output $PS_{16}$, the gate $G_{93}$ provides an output "1", and the flip-flop circuit $F_3$ shown in FIG. 6D is set.

The flip-flop circuit $F_3$ holds the set state, to provide a logical value "1" at its output Q and to open the gate $G_{95}$. On the other hand, the output $PS_{14}$ of the monomulti $N_8$ triggered by the output $PS_{16}$ is supplied to the input of the shift register $R_7$ through the gate $G_{95}$ and further through the gate $G_{97}$. The output $PS_{14}$ shifts the contents of the shift register $R_7$ by 1 bit, to write "1" into the location $X_1$. Although the bit of the location 3C of the register $M_3$ shown in FIG. 6C is "0", "1" is written into the shift register $R_7$ and a correction for the interpolation is carried out. That is, the bit for forming an interpolating dot in the non-dot portion [3, 8] in FIG. 3 is stored. Since the bits of [4, 8] and [5, 8] in FIG. 3 require no correction, "0" and "0" are written into the shift register $R_7$. At [6, 8], the interpolating bit "1" is again written into the shift register $R_7$ in the same manner as described above.

Thereafter, when the bit "1" corresponding to the dot [7, 8] is written into the shift register $R_7$, the output $PS_{10}$ is provided from the coincidence circuit $P_1$ shown in FIG. 6A. The wire driving device DR shown in FIG. 6D is driven, to form the dots [1, 8], [2, 8] and [7, 8] in FIG. 3 and to also form the interpolating dots [3, 8] and [6, 8]. When the formation of the dots and the interpolating dots proceeds in this way and the dots of the tenth column in FIG. 3 are formed, the counter $C_6$ illustrated in FIG. 6E counts "5". Since it coincides with "5" of the preset counter $C_7$, an output is provided from the coincidence circuit $P_3$ and is supplied to the gate $G_{100}$. Since the gate $G_{100}$ is kept open by the output of the monomulti $N_{12}$ triggered by the output $PS_{12}$, the output of the coincidence circuit $P_3$ passes through the gate $G_{100}$, to reset the counter $C_6$ and to become a signal for feeding the wire head to a predetermined position in order to provide a space of a letter or the like to be printed next. This is customary in conventional wire head printers and other head drive type printers, and the detailed description is omitted here in this specification.

As to the foregoing interpolating function, the outputs of the supplement detecting circuit U and the opening and closure of the gates $G_{86} - G_{89}$ will be explained in detail.

FIG. 12 illustrates interpolations at the time when, in the bit pattern of a letter, numeral, symbol or the like, 1 bit of the original pattern is magnified m times vertically and horizontally. There are four ways of the interpolations as shown at A, B, C and D in the figure. A in FIG. 12 represents the interpolation of a left upper part, B that of a left lower part, C that of a right upper part, and D that of a right lower part.

Figure 13:
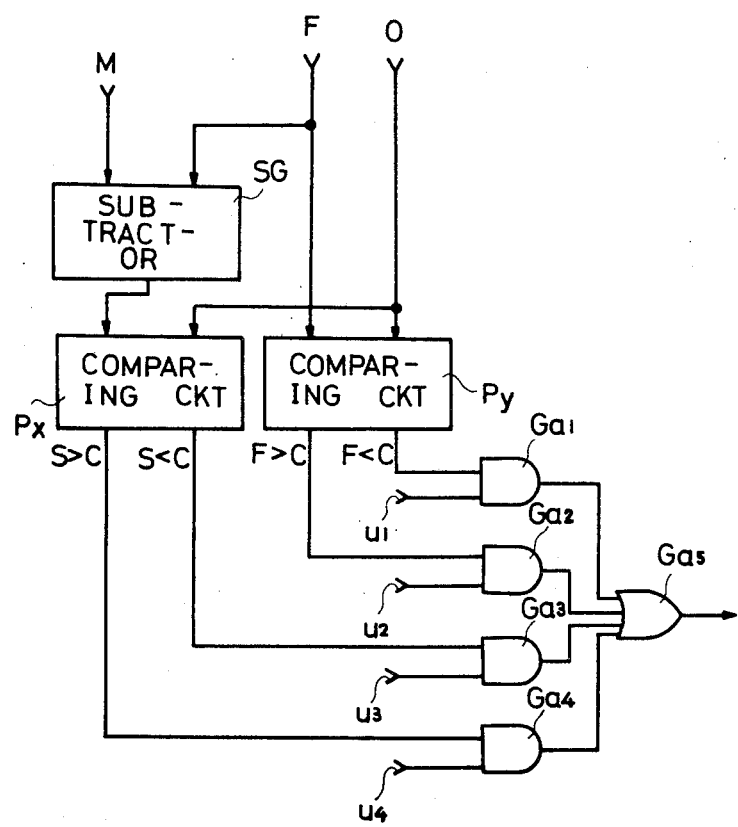
FIG. 13 is a diagram for explaining the supplement detecting circuit and a gate for controlling an output thereof.

FIG. 13 shows a circuit which determines the interpolation on the basis of the four kinds of interpolating domains and the outputs of the interpolation detecting circuit. M denotes the value of the magnification $m$, F a position in the horizontal direction in FIG. 12, and C a position in the vertical direction. The value at the time when the counter $C_3$ in the foregoing embodiment is of the scale of $m$ corresponds to F, while the value at the time when the counter $C_4$ is of the scale of $c$ corresponds to C. SG designates a subtractor. $P_x$ and $P_y$ designate comparing circuits, which correspond to the comparing circuit $P_2$ stated previously. Input terminals $u_1 - u_4$ of the gates $Ga_1 - Ga_4$ are supplied with the outputs of the supplement detecting circuit shown in FIG. 6H. In this manner, the interpolating bit is prepared on the basis of the appointment of the interpolating domain and the necessity for the interpolation.

When one character is formed in the above way, a predetermined space is taken and 5 × 7 dots of the next letter, numeral or symbol are formed again. When the recording of one row is thus terminated, the carriage return is performed.

Hereunder, description will be made of a case where dots of the latter half of the bit pattern in FIG. 3 are formed. When the dots of one row are terminated, a carriage return signal ES is generated from the side of the wire driving device DR by conventional means, and the wire head returns to a recording initiating position again. Such operation is an expedient which is customary in conventional wire dot printers and other apparatuses of this type, and the details are omitted because the present invention is not featured by this point.

In the period between the generation of the carriage return signal and the return of the wire head to the recording initiation position, the following preparations are made. When the printing of one row is terminated, the next operation is prepared for by the output $PS_{17}$ provided from the gate $G_{100}$ in FIG. 6E after forming the dots of the last column of the last character. At the termination of the printing of one row, the count value of the counter $C_4$ shown in FIG. 6B is "1", and the counter $C_8$ shown in FIG. 6F stores the number of times of the vertical shifts of the registers $M_1 - M_9$. It is therefore necessary to transfer the contents to the register before the respective counters are reset. The operation of transferring the contents of the counter $C_4$ shown in FIG. 6B will be first explained. An output is provided from the gate $G_{111}$ shown in FIG. 6G by means of the output $PS_{17}$ and triggers the monomulti $N_{14}$ through the gate $G_{112}$. By the output $PS_{18}$ of the monomulti $N_{14}$, the count value "1" of the counter $C_4$ shown in FIG. 6B is written into the register $R_6$.

Figure 6G:
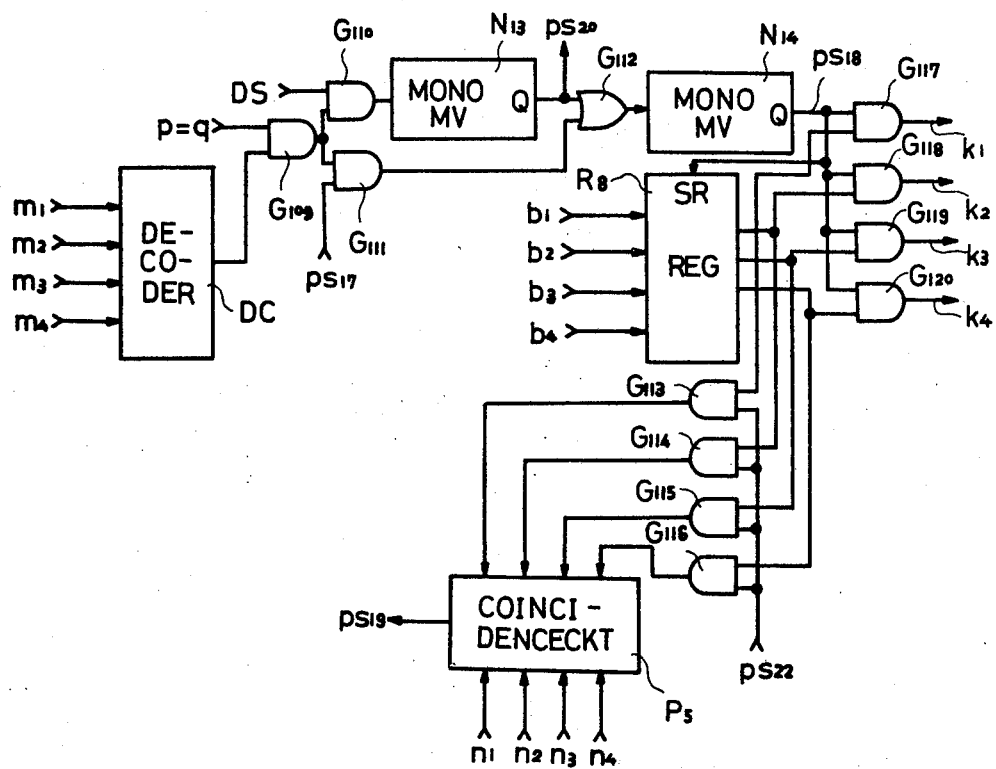

The gates $G_{117} - G_{120}$ shown in FIG. 6G are opened by the output $PS_{18}$, the memory outputs of the register $R_8$ are passed through the gates $G_{117} - G_{120}$, and outputs $k_1 - k_4$ from these gates are supplied to the inputs of the arithmetic circuit AD on one side thereof. The contents of the register $R_8$ are "0" during the period during which the dots of the first 7 rows of the letter or the like are formed, so that (0, 0, 0, 0) are supplied to the one-side inputs of the arithmetic circuit AD. The output $PS_{18}$ opens the gates $G_9 - G_{12}$ shown in FIG. 6A, to supply the count output "3" of the counter $C_8$ to the inputs of the arithmetic circuit AD on the other side thereof. Accordingly, "3" appears at the output of the arithmetic circuit AD and is written into the register $R_8$ by the fall of the output $PS_{18}$, so that the count contents of the counter $C_8$ are held. Here the count contents of the counter $C_8$ are not directly transferred to the register $R_8$, and the reason therefor is as stated below. No problem is involved in case where, as in the present embodiment, the recording of 1 character is completed by scanning the wire head only twice. In case of performing several times of scannings, however, it need be known that the stored contents of the registers $M_1 - M_9$ ought to be recorded from what row of the bit pattern of the same character as in the preceding scanning written anew from the character generator CG, at the next scanning in dependence on the number of the vertical shifts of the memory contents of the registers $M_1 - M_9$ as performed till the preceding scanning, and the bit pattern written anew need be shifted in the vertical direction by the number of times of the vertical shifts.

When the wire head arrives at the start position, the carriage return signal ES from the wire driving device DR triggers the monomulti $N_4$ through the gate $G_{162}$. The output $PS_1$ of the monomulti is supplied through the gate $G_{83}$ to the counter $C_5$. Accordingly, horizontal shift pulses for the shift register M are successively generated at the output of the counter $C_5$, and the bit pattern of FIG. 2 is transferred from the character generator CG to the registers $M_1 - M_9$ again. The operation at this time is the same as that described first. Therefore, in order to form the dots from the eighth row to the fourteenth row, the stored contents of the registers $M_1 - M_9$ are shifted in the vertical direction three times. Then, the contents of the location of the register $M_3$ become the bit "1" corresponding to the dot [4, 1] in FIG. 2. After a part of the dot pattern as corresponds to the first column, second column and third column of the dot pattern in FIG. 2 is written into the registers $M_3 - M_9$ by the last output of the counter $C_5$, the output $PS_4$ of the monomulti $N_6$ triggered by the terminal $d_5$ of the counter $C_5$ sets the flip-flop circuit F2 shown in FIG. 6F. By the output of the flip-flop circuit the gate $G_{106}$ is opened to pass the output pulses of the clock pulse generator CL therethrough, which are supplied through the gate $G_{104}$ as well as the gate $G_{103}$ to the counter $C_8$ and which shift the registers $M_1 - M_9$ in the vertical direction. When the counter $C_8$ counts 3 pulses, the stored contents "3" of the register $R_8$ are supplied to the coincidence circuit $P_5$ through the gates $G_{113} - G_{116}$ which are opened by the output Q of the flip-flop circuit F2. Consequently, an output $PS_{19}$ is provided from the coincidence circuit $P_5$ and resets the flip-flop circuit F2.

Accordingly, the 3 pulses having passed through the gate $G_{103}$ shift the contents of the registers $M_1 - M_9$ in the vertical direction three times. The output $PS_{19}$ sets the contents of the register $R_6$ in FIG. 6B into the counter $C_4$.

Figure 14:
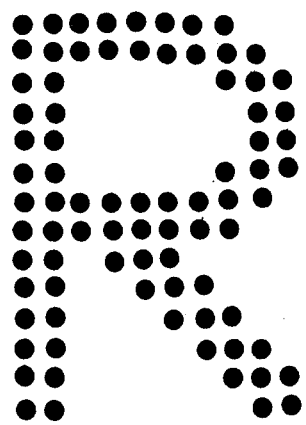
FIG. 14 is an enlarged dot diagram of the letter "R" formed by an apparatus of an embodiment of this invention.

Thereafter, the printing is performed in the same way as described first, to form the dots in and below the eighth row in FIG. 3 and to obtain an interpolated clear letter "R" as shown in FIG. 14.

This embodiment has been described as being 7 in the number of wires and "2" in the magnification of the character. In case where the magnification is integral times (for example, 1, 7, 14 or 21 times) as large as the number of wires, the operation proceeds in such a way that when the wire head shifts to the next scanning after terminating the scanning of enlargement bits corresponding to 1 bit of the original pattern, the printing is executed from the beginning of enlargement bits among bits of the next row in the original pattern. Hereunder, this operation will be explained. As an example, a case of forming a character with the original pattern magnified 14 times is taken. When the head has terminated two times of scannings and the magnification becomes "14," the counters $C_4$ and $C_3$ need be altered to the scale of 14, respectively. Let it now be supposed that an area corresponding to 14 dots has been recorded by the two complete scannings of the wire head and that the enlargement of 1 dot of the original pattern has been terminated. At this time, the counter $C_4$ counts "O", and the counter $C_3$ also counts "O". Since the decoder DC shown in FIG. 6G is so set as to produce an output when the magnification is 1, 7, 14, 21, . . . , the gate $G_{109}$ is open. When the output of the comparing circuit $P_2$ shown in FIG. 6B becomes $p = q$, the gate $G_{109}$ provides an output to open the gate $G_{101}$. It is well known that, in general, data include data indicative of an event and also control data featuring them. In the present embodiment, when the final data of 1 row is read out, control data DS indicating that it is the final is generated. The control data triggers the monomulti $N_{13}$ through the gate $G_{110}$ and generates an output $PS_{20}$. The output $PS_{20}$ resets the counter $C_4$ through the gate $G_{47}$, and adds "1" to the counter $C_8$ through the gate $G_{101}$, to vertically shift the original pattern by 1 bit. Thereafter, the operation is the same as previously stated.

The monomulti in the present embodiment is used in order to clearly indicate the relation between the respective outputs. This invention does not necessarily require such circuit, but actually the timing pulses may be formed on the basis of the reference clock pulse.

Although the wire dot printer has been referred to in the present embodiment, this invention is not restricted thereto but it is applicable to an electronic printer such as discharge breakdown printer. Only required is that the printer records letters, numerals, symbols etc. by dot matrices. Although the number of the dot forming wires has been made 7 in the present embodiment, it is not restrictive but it may be any suitable number. In that case, however, the construction of a part of the present embodiment is of course modified.

As described above in detail, this invention enlarges and records the original dot pattern in such a way that, with reference to the respective bits of the bit pattern corresponding to the dot matrix which forms a picture such as letter, numeral and symbol, the contents of the object bit of the original bit pattern are written into the registers until the enlargement magnification in the row or column direction is conformed to. Therefore, the construction is very simple as this type. Moreover, the enlargement magnification can be suitably altered, so that the desired magnified dot picture can be recorded as may be needed.

Further, by employing the first and second interpolating methods, the clearness of the picture does not change even when the enlargement magnification is increased. Since a computer or the like is not employed, the construction is small-sized.

What is claimed is:

1. A method for clarifying a character formed by a matrix of display components and non-display components comprising the steps:
   selecting an arbitrary minor matrix of two rows and two columns of two display components and two non-display components from a matrix representative of the character;
   detecting whether or not there is satisfied the condition that said two display components are adjacently formed in an oblique direction and that each of said two non-display components adjoin each of the said two display components; and
   displaying, if the aforementioned condition is satisfied, a part of one of the said two non-display components.

2. A method for clarifying a character formed by a matrix of display components and non-display components comprising the steps:
   selecting an arbitrary minor matrix of three rows and three columns of five display components and four non-display components from a matrix representative of the character;
   detecting whether or not there is satisfied the condition that three of said five display components - the first, second and third display components-are formed in an oblique direction and that the other remaining two display components are formed in a row or column direction such that one display component adjoins the aforementioned first display component and the other display component adjoins the aforementioned one display component, and that the angle between the aforementioned oblique and row or column directions is within 90°; and
   displaying, if the aforementioned condition is satisfied, a part of the non-display component which adjoins the first display component and the second display component.

3. A method for clarifying a character formed by a matrix of display components and non-display components as set forth in claim 2; further including the steps:
   selecting an arbitrary minor matrix of two rows and two columns of two display components and two non-display components from the matrix representative of the character;
   detecting whether or not there is satisfied such a condition that the aforementioned two display components are adjacently formed in an oblique direction and that each of the aforementioned two non-display components adjoin each of the aforementioned two display components; and
   displaying, if the aforementioned condition is satisfied, a part of one of the aforementioned two non-display components.

4. A method for increasing and clarifying a character formed by a matrix of display components and non-display components comprising the steps:
   storing a bit pattern in which the display components and the nondisplay components forming the character are converted into a first logical value and a second logical value respectively;
   presetting a row magnification and a column mangification whose magnification equals a predetermined value;
   reading out by the number of the row or column magnification a logical value of a bit selected from the aforementioned bit pattern in accordance with a predetermined order;
   detecting whether or not the array of both an arbitrary bit of the second logical value in the aforementioned bit pattern and the surrounding bits thereof coincides with a predetermined rule and, if it coincides, converting the arbitrary bit of the second logcal value into a bit of the first logical value;
   reading out the converted bit; and
   forming dots in accordance with the aforementioned bits read out;

wherein the step of detecting comprises detecting whether or not there is an array rule of bits which in an arbitrary minor matrix of two rows and two columns including the arbitrary one bit of the second logical value, contains an opposite bit to the arbitrary one bit in an oblique direction having the second logical value and in which the remaining other two bits have the first logical values respectively; and converting the aforementioned arbitrary one bit into a bit of the first logical value.

5. A method for increasing and clarifying a character formed by a matrix of display components and non-display components as set forth in claim 4; wherein the step of detecting comprises detecting whether or not there is an array rule of bits which in an arbitrary minor matrix of three rows and three columns including an arbitrary one bit of the second logical value, contains three bits of the first logical values-the first, second and third bits-adjoined respectively in an oblique direction and in which the other two bits of the first logical value are adjoined in a row or column direction with the one bit thereof adjoining the aforementioned first bit and the other bit thereof adjoining the said one bit and in which the angle between the aforementioned oblique and row or column directions falls within 90°, and in which the aforementioned arbitrary one bit adjoins the aforementioned first bit and the second bit and the remaining other three bits have the second logical value; and converting the aforementioned arbitrary one bit into a bit of the first logical value.

6. A method for increasing and clarifying a character formed by a matrix of display components and non-display components as set forth in claim 5; wherein the step of detecting comprises detecting whether or not there is an array rule of bits which in an arbitrary minor matrix of two rows and two columns including an arbitrary one bit of the second logical value, contains an opposite bit to the arbitrary one bit in an oblique direction having the second logical value and in which the remaining other two bits have the first logical values respectively; and converting the aforementioned arbitrary one bit into a bit of the first logical value.

7. An apparatus for clarifying a character formed by a matrix of display components and non-display components comprising:

first means for storing a bit pattern in which the display components and the non-display components forming the character are converted into bits of the first logical value and bits of the second logical value respectively;

second means for detecting whether there is satisfied the condition that in the aforementioned bit pattern two bits of the first logical value are adjoined in an oblique direction and that each of two bits of the second logical value adjoin each of the aforementioned two bits of the first logical value; and third means for converting the one of the said two bits of the second logical value into one bit of the first logical value if the detected condition is satisfied.

8. An apparatus for clarifying a character formed by a matrix of display components and non-display components comprising:

first means for storing a bit pattern in which the display components and the non-display components forming the character are converted into bits of the first logical value and bits of the second logical value respectively;

second means for detecting whether there is satisfied the condition that an arbitrary three bits of the first logical value-the first, second and third bits are formed in an oblique direction, and that the other two bits of the first logical value are formed in a row or column direction such that one bit thereof adjoins the first bit and the other bit thereof adjoins the said one bit, and that the angle between the aforementioned oblique and row or column directions is within 90°; and third means for displaying the one bit of the second logical value which adjoins the aforementioned first and second bits if the detected condition is satisfied.

9. An apparatus for clarifying a character formed by a matrix of display components and non-display components as set forth in claim 8; further including fourth means for detecting whether there is satisfied the condition that in the aforementioned bit pattern two bits of the first logical value are adjoined in an oblique direction and that each of two bits of the second logical value adjoin each of the aforementioned two bits of the first logical value; and fifth means for converting the one of the aforementioned two bits of the second logical value into one bit of the first logical value if the detected condition is satisfied.

10. An apparatus for increasing and clarifying a character formed by a matrix of display components and non-display components comprising:

first means for storing a bit pattern in which the display components and the non-display components forming the character are converted into bits of the first logical value and the second logical value respectively;

second means for storing a row magnification of the character;

third means for storing a column magnification whose magnification equals that of the row magnification;

fourth means for writing into a register by the number of the row or column magnification a logical value of a bit selected from the aforementioned bit pattern in accordance with a predetermined order;

fifth means for detecting whether the array of both an arbitrary bit of the second logical value in the aforementioned bit pattern and the surrounding bits thereof coincides with a predetermined rule and, if it coincides, converting the arbitrary bit of the second logical value into a bit of the first logical value;

sixth means for writing the converted bit into the aforementioned register; and dot forming means for forming dots in accordance with bits derived from the aforementioned register;

wherein said fifth means comprises means for detecting such an array rule of bits that in an arbitrary matrix of two rows and two columns including the arbitrary one bit of the second logical value, an opposite bit to the arbitrary one bit in an oblique direction has the second logical value and that the remaining other two bits have the first logical values respectively, and means for converting the aforementioned arbitrary one bit into a bit of the first logical value.

11. An apparatus for increasing and clarifying a character formed by a matrix of display components and non-display components comprising:

first means for storing a bit pattern in which the display components and the non-display components forming the character are converted into bits of the first logical value and the second logical value respectively;

second means for storing a row magnification of the character;

third means for storing a column magnification whose magnification equals that of the row magnification;

fourth means for writing into a register by the number of the row or column magnification a logical value of a bit selected from the aforementioned bit pattern in accordance with a predetermined order;

fifth means for detecting whether the array of both an arbitrary bit of the second logical value in the aforementioned bit pattern and the surrounding bits thereof coincides with a predetermined rule and, if it coincides, converting the arbitrary bit of the second logical value into a bit of the first logical value;

sixth means for writing the converted bit into the aforementioned register; and dot forming means for forming dots in accordance with bits derived from the aforementioned register;

wherein said fifth means comprises means for detecting such an array rule of bits that in an arbitrary matrix of three rows and three columns including the arbitrary one bit of the second logical value, three bits of the first logical value-the first, second and third bits-are adjoined respectively in an oblique direction and that the other two bits of the first logical value are adjoined in a row or column direction such that one bit thereof adjoins the said first bit and the other bit thereof adjoins the said one bit, and that the angle between the aforementioned oblique and row or column directions is within 90°, and that the aforementioned arbitrary one bit adjoins the said first bit and the said second bit, and that the remaining other three bits have the second logical value; and means for converting the aforementioned arbitrary one bit of the second logical value into a bit of the first logical value.

12. An apparatus for increasing and clarifying a character formed by a matrix of display components and non-display components as set forth in claim 11; wherein said fifth means further comprises means for detecting such an array rule of bits that in an arbitrary minor matrix of two rows and two columns including an arbitrary one bit of the second logical value, an opposite bit to the arbitrary one bit in an oblique direction has the second logical value and that the remaining other two bits have the first logical value respectively; and means for converting the aforementioned arbitrary one bit into a bit of the first logical value.

* * * * *